(12) United States Patent
Clauer et al.

(10) Patent No.: US 12,162,544 B2
(45) Date of Patent: Dec. 10, 2024

(54) DRIVERLESS TRANSPORT VEHICLE AND METHOD FOR MOVING A SEMI-TRAILER USING A DRIVERLESS TRANSPORT VEHICLE

(71) Applicants: Bayerische Motoren Werke Aktiengesellschaft, Munich (DE); Staubli WFT GmbH, Sulzbach-Rosenberg (DE)

(72) Inventors: Dana Clauer, Munich (DE); Marco Prüglmeier, Munich (DE); Thomas Irrenhauser, Munich (DE); Josef Eckl, Prackenbach (DE); Fabian Wittich, Gebenbach (DE)

(73) Assignees: Bayerische Motoren Werke Aktiengesellschaft, Munich (DE); Stäubli WFT GmbH, Sulzbach-Rosenberg (DE)

( * ) Notice: Subject to any disclaimer, the term of this patent is extended or adjusted under 35 U.S.C. 154(b) by 617 days.

(21) Appl. No.: 17/297,937

(22) PCT Filed: Nov. 29, 2019

(86) PCT No.: PCT/EP2019/083076
§ 371 (c)(1),
(2) Date: May 27, 2021

(87) PCT Pub. No.: WO2020/109545
PCT Pub. Date: Jun. 4, 2020

(65) Prior Publication Data
US 2022/0024529 A1 Jan. 27, 2022

(30) Foreign Application Priority Data
Nov. 30, 2018 (DE) ...................... 10 2018 130 584.2

(51) Int. Cl.
*B62D 53/12* (2006.01)
*B60B 19/00* (2006.01)
(Continued)

(52) U.S. Cl.
CPC ............ *B62D 53/12* (2013.01); *B60B 19/003* (2013.01); *B60W 60/0025* (2020.02);
(Continued)

(58) Field of Classification Search
CPC ................ B62D 53/12; B62D 53/0842; B62D 53/0857; B62D 53/0864; B62D 1/015;
(Continued)

(56) References Cited

U.S. PATENT DOCUMENTS 2,710,201 A * 6/1955 Winn ........................ B60D 1/66
280/430
3,391,950 A * 7/1968 Mary ................... B62D 53/125
280/421
(Continued)

FOREIGN PATENT DOCUMENTS

CN 1922041 2/2007
CN 100443350 12/2008
(Continued)

OTHER PUBLICATIONS

Translation of WO2018202483, cited on IDS. (Year: 2018).*
(Continued)

*Primary Examiner* — Russell Frejd
(74) *Attorney, Agent, or Firm* — FITCH EVEN TABIN & FLANNERY, LLP

(57) ABSTRACT

The invention relates to a driverless transport vehicle for moving a semi-trailer. The driverless transport vehicle comprises a coupling device for automatically coupling the driverless transport vehicle to a kingpin of the semi-trailer.
(Continued)

The invention also relates to a method for moving a semi-trailer using a driverless transport vehicle.

15 Claims, 2 Drawing Sheets

(51) Int. Cl.
*B60W 60/00* (2020.01)
*B62D 53/08* (2006.01)
*B66F 9/06* (2006.01)
*B66F 9/065* (2006.01)

(52) U.S. Cl.
CPC ..... *B62D 53/0842* (2013.01); *B62D 53/0857* (2013.01); *B66F 9/063* (2013.01); *B66F 9/065* (2013.01); *B60W 2300/145* (2013.01)

(58) Field of Classification Search
CPC .............. B62D 1/465; B60B 19/003; B60W 2300/145; B60W 60/0025; B66F 9/063; B66F 9/065
See application file for complete search history.

(56) References Cited

U.S. PATENT DOCUMENTS

| | | | | |
|---|---|---|---|---|
| 3,506,230 | A * | 4/1970 | Vivian | B63B 25/28 |
| | | | | 410/56 |
| 3,603,544 | A * | 9/1971 | Griffith | B62D 53/0857 |
| | | | | 410/56 |
| 3,628,811 | A * | 12/1971 | Rivers | B62D 49/005 |
| | | | | 280/421 |
| 5,109,940 | A | 5/1992 | Yardley | |
| 5,154,249 | A | 10/1992 | Yardley | |
| 5,559,696 | A | 9/1996 | Borenstein | |
| 6,588,418 | B1 | 7/2003 | Loving | |
| 7,429,051 | B2 | 9/2008 | Bauer | |
| 7,731,215 | B2 | 6/2010 | Algueera | |
| 7,793,966 | B2 | 9/2010 | Richter | |
| 8,798,842 | B2 | 8/2014 | Woolf | |
| 8,838,322 | B1 | 9/2014 | Zhu | |
| 8,930,140 | B2 | 1/2015 | Trombley | |
| 10,562,463 | B1 | 2/2020 | Speer | |
| 11,358,660 | B2 | 6/2022 | Newton | |
| 11,420,691 | B2 * | 8/2022 | Köster | B60D 1/64 |
| 2003/0233177 | A1 | 12/2003 | Johnson | |
| 2006/0037787 | A1 | 2/2006 | Hammonds | |
| 2006/0293800 | A1 | 12/2006 | Bauer | |
| 2008/0036175 | A1 | 2/2008 | Alguera | |
| 2011/0037241 | A1 * | 2/2011 | Temple | B60D 1/64 |
| | | | | 280/421 |
| 2011/0107938 | A1 | 5/2011 | Weidemann | |
| 2012/0191285 | A1 | 7/2012 | Woolf | |
| 2013/0193669 | A1 | 8/2013 | Glazner | |
| 2013/0226390 | A1 | 8/2013 | Luo | |
| 2014/0251556 | A1 | 9/2014 | Orton | |
| 2015/0045992 | A1 | 2/2015 | Ashby | |
| 2017/0192438 | A1 | 7/2017 | Morimoto | |
| 2017/0231427 | A1 | 8/2017 | Cathey | |
| 2018/0022405 | A1 | 1/2018 | Gecchelin | |
| 2018/0341259 | A1 | 11/2018 | Stroebel | |
| 2019/0064828 | A1 | 2/2019 | Meredith | |
| 2019/0064835 | A1 * | 2/2019 | Hoofard | G05D 1/228 |
| 2019/0095861 | A1 * | 3/2019 | Baldwin | G06Q 10/0838 |
| 2019/0337342 | A1 | 11/2019 | Genheimer et al. | |
| 2019/0367105 | A1 * | 12/2019 | Grossman | G01S 17/88 |
| 2019/0367107 | A1 | 12/2019 | Grossman | |
| 2020/0055357 | A1 | 2/2020 | Laine | |
| 2020/0150686 | A1 * | 5/2020 | Wieschemann | B60D 1/62 |
| 2022/0017162 | A1 | 1/2022 | Clauer | |
| 2022/0024529 | A1 | 1/2022 | Clauer | |
| 2022/0024530 | A1 | 1/2022 | Clauer | |
| 2022/0048497 | A1 * | 2/2022 | Delizo | B60W 10/184 |
| 2022/0055430 | A1 * | 2/2022 | Delizo | B62D 15/0285 |

FOREIGN PATENT DOCUMENTS

| | | |
|---|---|---|
| CN | 104417634 | 3/2015 |
| CN | 105966177 | 9/2016 |
| CN | 106741239 | 5/2017 |
| CN | 106774300 | 5/2017 |
| CN | 107264629 A | 10/2017 |
| CN | 107340771 | 11/2017 |
| CN | 207424675 | 5/2018 |
| CN | 108508895 | 9/2018 |
| CN | 108839725 | 11/2018 |
| DE | 10335264 | 3/2005 |
| DE | 102004051760 | 4/2006 |
| DE | 102008014572 | 9/2009 |
| DE | 102009052382 A1 | 5/2011 |
| DE | 102012207269 A1 | 11/2013 |
| DE | 102016218603 A1 | 3/2018 |
| DE | 202018104542 | 8/2018 |
| DE | 102018105998 | 5/2019 |
| FR | 2938812 | 5/2010 |
| JP | 4553267 | 9/2010 |
| WO | 2014131624 A1 | 9/2014 |
| WO | 2018055321 | 3/2018 |
| WO | 2018162031 A1 | 9/2018 |
| WO | 2018202483 A1 | 11/2018 |

OTHER PUBLICATIONS

Article 94 (3) EPC; European Application No. 19817173.8; dated Jul. 29, 2022; 16 pages.
Chinese Office Action; Chinese Application No. 201980078776.6; dated Aug. 31, 2022; 24 pages.
Chinese Office Action; Chinese Application No. 201980078776.6; dated Feb. 27, 2023; 18 pages.
CNSR; Chinese Application No. 201980078776.6; dated Feb. 27, 2023; 2 pages.
DPMA; App. No. 10 2018130 586.9; Search Report mailed Oct. 9, 2020.
EP Office Action; European Application No. 19817173.8 dated Apr. 11, 2023; 8 pages.
German Office Action and Search Report; German Application No. 102018130585.0; dated Sep. 10, 2020; 17 pages,.
PCT; App. No. PCT/EP/2019/083082; International Search Report and Written Opinion mailed Feb. 7, 2020.
PCT; App. No. PCT/EP2019/083079; International Search Report and Written Opinion mailed Mar. 3, 2020.
Ullrich, G,; Albrecht, T.: Driverless transport systems. 2nd edition, Wiesbaden, Springer, 2014, p. 127, 129.—ISBN 978-3-8348-2591-9; 4 pages.
Wikipedia; "LKW-Bremsanlage"; https://de.wikipedia.org/w/index.php?title=LKW-Bremsanlage&oldid=I; dated Dec. 29, 2020; 11 pages.
PCT; App. No. PCT/EP2019/083076; International Search Report and Written Opinion mailed Feb. 7, 2020.
DPMA; App. No. 10 2018 130 584.2; Search Report mailed Oct. 9, 2020.
Clauer, Dana; "Konzepterstellung für die Implementierung automatisierter Warehouse on Wheels Prozesse mittels fahrerloser Transportsysteme am Beispiel des BMW Group Werks Leipzig"; Deutscher Logistik-Kongress; Thesis Conference; 2018.
Osram; "Meilenstein für Laser-Sensoren in selbstfahrenden Autos"; https://www.osram-group.de/de-de/media/press-releases/pr-2016/07-11-2016; Nov. 7, 2016.
Kuka—Robots & Automation; "Clever Autonomy for Mobile Robots—Kuka Navigation Solution"; https://www.youtube.com/watch?v=kN9a7W_hnSQ; May 26, 2016.
EP Examination Report; European Application No. 19 816 237.2; dated Sep. 7, 2023 (14 pages).
The Federal Logistics Association (BVL) participant in the 35th edition of the German Logistics Exhibition in Berlin from Nov. 17 to 19, 2018; https://www.vallee-partner.de/blog/dlk18 (1 page).
Deutscher Logistik Congress Oct. 17-19, 2018; "C4 Thesis Conference" https://www.gbv.de/dms/tib-ub-hannover/1035300524.pdf (5 pages).

(56) References Cited

OTHER PUBLICATIONS

Prof. Dr.-Ing. Fottner, Johannes; "Publications of the chair" https://www.mec.ed.tum.de/en/fml/research/publications/ (2 pages).

Clauer, D; "Konzepterstellung für die Implementierung automatisierter Warehouse on Wheels Prozesse mittels fahrerloser Transportsysteme am Beispiel des BMW Group Werks Leipzig"; https://mediatum.ub.tum.de/node?id=1518793&change_language=en: (2 pages).

Chinese Office Action from Chinese Application No. 201980078776.6; dated Oct. 29, 2023; In Chinese with English Translation (32 pages).

Office Action from U.S. Appl. No. 17/297,941; dated Oct. 10, 2023; In English (13 pages).

Office Action from U.S. Appl. No. 17/297,914; dated Dec. 29, 2023; in English (8 pages).

European Patent Office, Commnication pursuant to Article 94(3) EPC, Examination Report, issued Mar. 26, 2024 for Euopean Application No. 19 817 173.8 (9 pages) and English Translation (9 pages).

Office Action from U.S. Appl. No. 17/297,941; dated Apr. 8, 2024; in English (13 pages).

Notice of Allowance from U.S. Appl. No. 17/297,914 ; Dated Apr. 11, 2024; in English (7 pages).

\* cited by examiner

DRIVERLESS TRANSPORT VEHICLE AND METHOD FOR MOVING A SEMI-TRAILER USING A DRIVERLESS TRANSPORT VEHICLE

CROSS-REFERENCE TO RELATED APPLICATIONS

This application is a U.S. national phase application of International Application No. PCT/EP2019/083076, filed Nov. 29, 2019, designating the United States, which claims priority to German Application No. 10 2018 130 584.2, filed Nov. 30, 2018.

FIELD

A driverless transport vehicle for moving a semi-trailer is specified. Furthermore, a method for moving a semi-trailer by a driverless transport vehicle is specified.

BACKGROUND

According to the current prior art, trailers in the form of semi-trailers or trailers are transported with a classical tractor in production factories. These tractors are designed for the long-distance employment on the road. In the factory, it often has to be maneuvered, however, the tractors are not very maneuverable. For driving the operating machines, an employee is additionally required, who drives the tractor. Mostly, the drives are only very short, which is not very efficient with respect to the fuel consumption.

It is disadvantageous in the known tractors, that at least one employee is respectively required, who drives the tractor. Further, tractors are not ideally suitable for factory premises.

It is an object to be solved of at least some embodiments to specify a driverless transport vehicle, by which a semi-trailer can be moved. It is a further object to specify a method for moving a semi-trailer by a driverless transport vehicle.

SUMMARY

These objects are solved by the subject matters according to the independent claims. Advantageous embodiments and developments of the subject matter are further apparent from the dependent claims, the following description and from the drawings.

A driverless transport vehicle described here comprises a coupling device for coupling, in particular for automatically coupling, the driverless transport vehicle (FTF) to a kingpin of a semi-trailer or a so-called trailer.

The driverless transport vehicle can also be referred to as driverless transport system (FTS) or as an automated guided vehicle (AGV).

The surface-movable driverless transport system is in particular used for the transport of a trailer on the factory premises. Therein, the driverless transport system lifts the trailer at the front end and can move it with the aid of the wheels at the rear end of the trailer. The driverless transport system receives the trailer at the storage location and automatically takes it to the desired factory hall and an unloading and/or loading site, respectively. Therein, the driverless transport system can recognize obstacles in the vicinity of the platform and of the optionally attached semi-trailer with the aid of sensors and optionally drive around them or stop.

Preferably, the driverless transport system can tow loads up to 40 t, thus for example a semi-trailer with 40 t. Furthermore, the driverless transport vehicle is indoor and outdoor enabled and comprises an omnidirectional drive. Preferably, the driverless transport vehicle further comprises the most recent sensor and navigation technology.

The driverless transport system can be employed for the traction operation of different variants of semi-trailers, for example of tautliners, box trailers, low bed trailers, container trailers, tank trailers.

Preferably, the coupling device comprises an adapter unit for connecting to the kingpin of the semi-trailer in form- and/or force-fit manner. In particular, the coupling device includes a fifth-wheel coupling with a fifth-wheel plate, which is carried by the driverless transport system. Therein, the fifth-wheel coupling serves for supporting and carrying the trailer with intervention of the kingpin on the one hand and for locking the kingpin to the fifth-wheel plate on the other hand among other things. Herein, a normalized fifth-wheel coupling and fifth-wheel plate are in particular employed to be able to receive and maneuver as many usual semi-trailers as possible.

Furthermore, the coupling device can comprise a device for lifting the semi-trailer, in particular a hydraulic device. This device can for example be arranged between the fifth-wheel coupling and the structure/body of the driverless transport system such that the fifth-wheel coupling (and the front area of the semi-trailer/trailer associated therewith) can be lifted and lowered in relation to the structure/body of the driverless transport system. Alternatively hereto, the chassis of the driverless transport system could also be provided with an air suspension or the like as the said device, as it is usually also the case in semi-trailer tractors, such that lifting and lowering the front part of the semi-trailer/trailer is effected by height adjustment of the structure/body of the driverless transport system and thereby also of the fifth-wheel coupling.

According to a further embodiment, the driverless transport vehicle comprises a plurality of sensors for surroundings detection. For example, the driverless transport vehicle can comprise a substantially cuboid base body, at which at least four laser sensors are arranged. For example, at least one laser sensor for environmental recognition can respectively be arranged at four different corners or edges of the base body of the driverless transport vehicle. In further configuration of the invention, the driverless transport vehicle additionally comprises sensors for automatically coupling the coupling device of the driverless transport vehicle to the kingpin. Hereby, the fifth-wheel coupling can for example be aligned with and coupled to the kingpin in simple manner. Hereto, the driverless transport vehicle is moved in relation to the kingpin in particular depending on the data ascertained by the corresponding sensors. Alternatively hereto, it would optionally also be conceivable to support the fifth-wheel coupling relatively movable to the structure/body of the driverless transport vehicle in vehicle transverse direction and/or in vehicle longitudinal direction to hereby achieve the coupling position between fifth-wheel coupling and kingpin.

According to a further embodiment, the driverless transport vehicle comprises a plurality of drive wheels, which are controllable such that the driverless transport vehicle is omnidirectionally movable. For example, at least two drive wheels can be applied with different drive torques and/or oppositely oriented drive torques and/or oppositely oriented rotational directions. In particular, the driverless transport system comprises at least one front axle and at least one rear axle and corresponding drive wheels associated with the axles, respectively, which are operable with different drive torques and/or oppositely oriented drive torques and/or oppositely oriented rotational directions.

Furthermore, a method for moving a semi-trailer by a driverless transport vehicle is specified. Therein, a driverless transport vehicle is, preferably automatically, coupled to a semi-trailer, wherein a coupling device of the driverless transport vehicle is preferably connected to the kingpin of the semi-trailer. For example, an adapter unit of the coupling device can establish a form- and/or force-fit connection to the kingpin. Hereto, a fifth-wheel coupling already described above is in particular employed. Furthermore, the semi-trailer can be lifted by a device for lifting, in particular a hydraulic device, immediately before and/or during and/or immediately after coupling such that the semi-trailer can be moved by the driverless transport vehicle. Hereto, a device already described above is for example employed for lifting the semi-trailer.

BRIEF DESCRIPTION OF THE DRAWINGS

Further advantages and advantageous embodiments of the driverless transport vehicle described here and of the method for moving a semi-trailer by a driverless transport vehicle are apparent from the embodiments described in the following in context of FIGS. 1 and 2. There is shown in.

Figure 1:
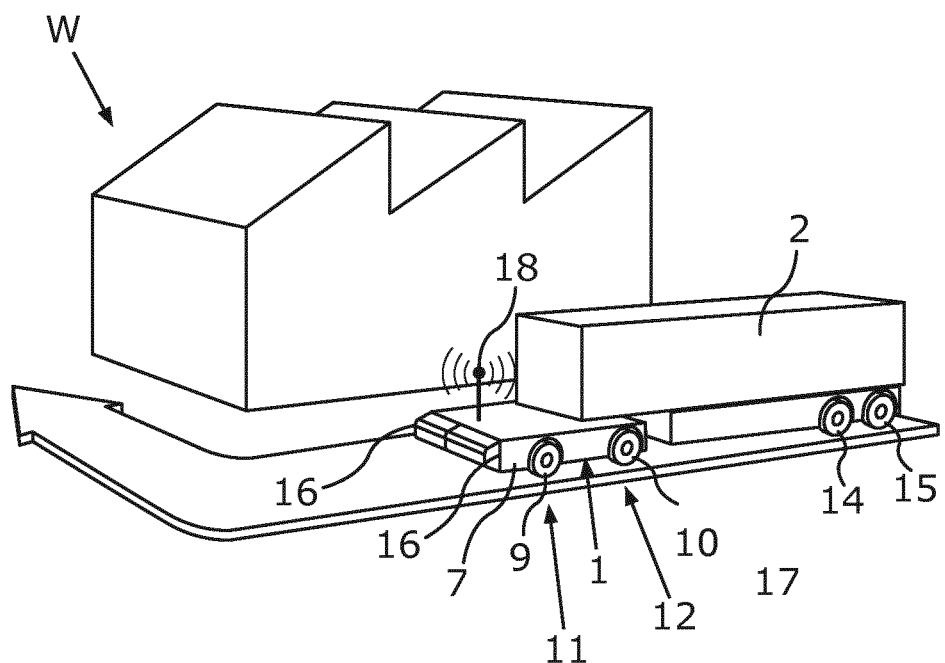
FIG. 1 a schematic representation of a driverless transport vehicle for moving a semi-trailer according to an embodiment, and FIG. 2 a schematic representation of a driverless transport vehicle for moving a semi-trailer according to a further embodiment.

In the embodiments and figures, identical or identically acting constituents can each be provided with the same reference characters. The illustrated elements and the size ratios thereof among each other are basically not to be regarded as true to scale. Rather, individual elements can be illustrated excessively thickly or largely dimensioned for better representability and/or for better comprehension.

DESCRIPTION OF THE PREFERRED EMBODIMENTS

FIG. 1 shows a driverless transport vehicle 1, which moves a semi-trailer 2. As is apparent in FIG. 2, a coupling device 4 of the driverless transport vehicle 1 is therein connected to the kingpin 3 of the semi-trailer 2.

Alternatively or additionally, the embodiments shown in the figures can comprise further features according to the embodiments of the general description.

As is apparent from FIG. 1, the driverless transport vehicle 1 serves for moving the semi-trailer 2 in particular within factory premises W. Namely, it has turned out that the previous moving in factory premises W, in which respective semi-trailers 2 or trailers are transported with a classical tractor in production factories, is not reasonable, in particular from economical view. Namely, these tractors are designed for the long-distance employment on the road and are not very efficient with respect to the energy consumption in drives in factory premises W, which are mostly only very short in proportion to the long-distance employment. In addition, it often has to be maneuvered on the factory premises W; however, the tractors are not very maneuverable.

For this reason, instead of a semi-trailer tractor, the driverless transport vehicle 1 is presently provided on the factory premises W, which can be automatically coupled to the semi-trailer 2. Hereto, the driverless transport vehicle 1 comprises the coupling device 4 apparent in FIG. 2, which is connectable to the kingpin 3 of the semi-trailer 2 or connected to it in FIG. 2.

Figure 2:
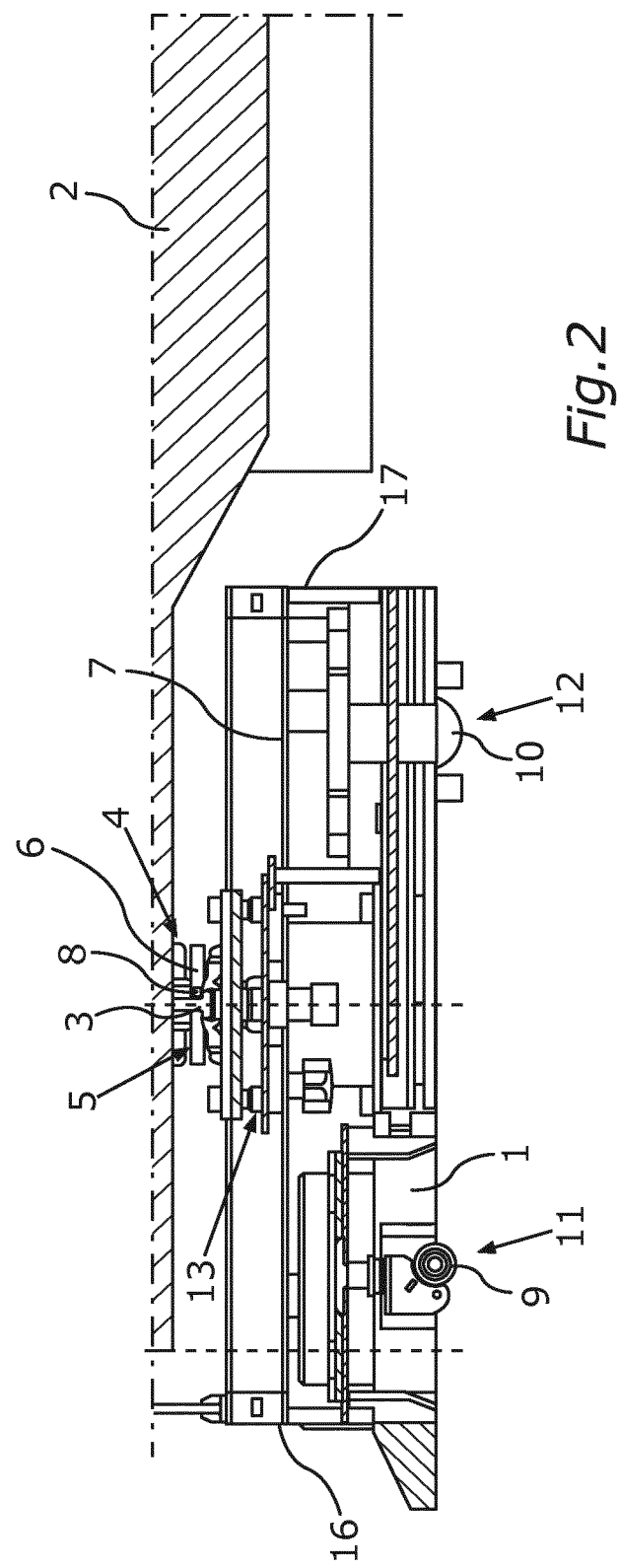

As is apparent from FIG. 2, the coupling device 4 comprises an adapter unit for connecting to the kingpin 3 in form- and/or force-fit manner, which here includes a usually employed fifth-wheel coupling 5. Herein, the fifth-wheel coupling 5 comprises a fifth-wheel plate 6, which is carried by a structure or body 7 of the driverless transport system 1. A locking device 8 is integrated in the fifth-wheel plate 6, by means of which the kingpin 3 can be locked to the fifth-wheel plate 6. Thus, the fifth-wheel coupling 5 serves for supporting and carrying the trailer 2 with intervention of the kingpin 3 on the one hand and for locking the kingpin 3 to the fifth-wheel plate 6 on the other hand among other things.

Herein, a normalized fifth-wheel coupling 5 and fifth-wheel plate 6 are in particular employed to be able to receive and maneuver as many usual semi-trailers 2 as possible.

Furthermore, the driverless transport vehicle 1 comprises a plurality of drive wheels, of which respective front and rear drive wheels 9, 10 are shown in FIGS. 1 and 2. Here, they are controllable such that the driverless transport vehicle 1 is omnidirectionally movable. For example, at least two drive wheels 9, 10 can be formed such that they can be applied with different drive torques and/or oppositely oriented drive torques and/or oppositely oriented rotational directions. In particular, the driverless transport system 1 can comprise at least one front axle 11 and at least one rear axle 12 and corresponding, associated drive wheels 9, 10, respectively, which are operable with different drive torques and/or oppositely oriented drive torques and/or oppositely oriented rotational directions. Thus, the driverless transport vehicle 1 is for example omnidirectionally movable in vehicle longitudinal direction and vehicle transverse direction. In a particular embodiment, the driverless transport vehicle 1 comprises a front axle 11 with respective, driven and steerable front wheels 9 and two rear axles 12 with respective, driven and steerable rear wheels 10. Hereby, the semi-trailer 2 is particularly well maneuverable.

It is clear that other configurations of driven and steerable wheels of the driverless transport vehicle 1 are also conceivable within the scope of the invention. Therein, the driverless transport vehicle 1 can also comprise rigid and/or non-driven wheels.

Furthermore, the driverless transport vehicle 1 comprises a device 13 for lifting the front end of the semi-trailer 2 such that it can be moved with the aid of its wheels 14, 15 at the rear end of the trailer 2. This device 13 can for example be a hydraulic device, by means of which the trailer 2 can be lifted immediately before and/or during and/or immediately after coupling the kingpin 3 to the fifth-wheel coupling 5, such that it can be moved by the driverless transport vehicle 1. In particular for improving the maneuverability of the trailer 2 and of the articulated truck overall, it would optionally also be conceivable that at least one axle and the corresponding wheels 14, 15 of the trailer 2, respectively, are lifted by corresponding control/manipulation.

According to FIG. 2, in the present case, the hydraulic device 13 is arranged between the fifth-wheel coupling 5 and the structure/body 7 of the driverless transport system 1. Herein, respective hydraulic elements, for example piston-cylinder elements, are for example arranged between the fifth-wheel plate 6 and the structure/body 7, by means of which the fifth-wheel plate 6 can be lifted and lowered in relation to the structure/body 7 in vehicle vertical direction.

In order to achieve automatic coupling of the kingpin 3 to the fifth-wheel coupling 5, the coupling device 4 for example comprises respective sensors for automatically coupling to the kingpin 3. Hereby, the position of the fifth-wheel coupling 5 in relation to the kingpin 3 can for example be ascertained. Herein, it would be conceivable to support the fifth-wheel coupling 5 relatively movable to the structure/body 7 of the driverless transport vehicle 1 in vehicle transverse direction and/or in vehicle longitudinal direction such that the fifth-wheel coupling 5 can be (finely) adjusted in relation to the kingpin 3 according to relative position ascertained by means of the sensor technology until the coupling position between fifth-wheel coupling 5 and kingpin 3 is achieved. If a coarse adjustment between fifth-wheel coupling 5 and kingpin 3 is in particular required, it can be effected by moving the driverless transport vehicle 1 in relation to the kingpin 3. Optionally, the positioning of the fifth-wheel coupling 5 in relation to the kingpin 3 can also be performed exclusively by moving the driverless transport vehicle 1. After achieved coupling position between fifth-wheel coupling 5 and kingpin 3, which is for example captured by a corresponding sensor technology, the automatic locking of the kingpin 3 to the fifth-wheel coupling 5 can then be effected by means of the locking device 8.

Decoupling after maneuvering the trailer 1 can be effected in correspondingly reversed order in that the locking device 8 is first detached and then the fifth-wheel coupling 5 is disengaged from the kingpin 3 by assistance by means of the sensor technology, in that for example the driverless transport vehicle 1 is moved and/or the fifth-wheel coupling 5 is moved in relation to the structure/body 7.

Alternatively to the described device for lifting the fifth-wheel plate 6, the chassis of the driverless transport system 1 can also serve as the device for lifting the front end of the semi-trailer 2. Herein, it would for example be conceivable to support the respective wheels 9, 10 of the driverless transport vehicle 1 on the structure/body 7 via an air suspension or the like such that lifting and lowering the driverless transport system 1 and thereby also the front end of the trailer 2 can be performed by height variation of respective air springs or the like of the air suspension.

In addition, the driverless transport vehicle 1 comprises a plurality of sensors for surroundings detection. For example, the driverless transport vehicle 1 can comprise a structure 7 with a substantially cuboid base body, at which at least four laser sensors or like sensors are arranged. For example, respective sensors can be arranged at four different corners or edges 16, 17 of the base body 7 of the driverless transport vehicle 1. Therein, the driverless transport system 1 can recognize obstacles in the vicinity of the vehicle 1 and of the optionally attached semi-trailer 2 with the aid of the sensors and optionally drive around them or stop.

In addition, the driverless transport vehicle 1 can be connected to a central control of the factory premises for example by means of a transmit and/or receiver unit 18 to for example thus be guided to the corresponding trailers 1 and the corresponding unloading and/or loading sites, respectively.

The invention claimed is:

1. A driverless transport vehicle for moving a semi-trailer, comprising:
    a substantially cuboid base body, at which a plurality of sensors for surroundings detection are arranged;
    a coupling device for automatically coupling the driverless transport vehicle to a kingpin of a semi-trailer;
    the coupling device comprising a fifth-wheel coupling with a fifth-wheel plate for connecting to the kingpin; and
    the coupling device further comprising at least one sensor configured to ascertain a position of the fifth-wheel coupling in relation to the kingpin for automatically coupling the coupling device to the kingpin by facilitating alignment of the fifth-wheel coupling to the kingpin;
    wherein the plurality of sensors for surroundings detection comprise at least four sensors arranged at predetermined positions on the substantially cuboid base body to recognize objects in a vicinity of the vehicle and to facilitate autonomous movement of the vehicle in different directions.

2. The driverless transport vehicle according to claim 1, wherein the coupling device comprises an adapter unit for connecting to the kingpin of the semi-trailer in a form-and/or force-fit manner.

3. The driverless transport vehicle according to claim 1, wherein the coupling device comprises a device for lifting the semi-trailer.

4. The driverless transport vehicle according to claim 3, wherein the device for lifting the semi-trailer is a hydraulic device.

5. The driverless transport vehicle according to claim 4, wherein the hydraulic device is arranged between the fifth-wheel coupling and a body of the vehicle such that the fifth-wheel coupling and a front area of the semi-trailer can be lifted and lowered in relation to the body of the vehicle.

6. The driverless transport vehicle according to claim 3, wherein the device for lifting the semi-trailer comprises an air suspension device disposed on a chassis of the vehicle, the air suspension configured to lift and lower a front part of the semi-trailer by height adjustment of the vehicle.

7. The driverless transport vehicle according to claim 1, comprising a plurality of drive wheels, which are formed to omnidirectionally move the driverless transport vehicle.

8. The driverless transport vehicle according to claim 7, wherein the plurality of drive wheels comprises at least two drive wheels that are configured such that the at least two drive wheels can be applied with different drive torques and/or oppositely oriented drive torques and/or oppositely oriented rotational directions.

9. A method for moving a semi-trailer by a driverless transport vehicle, comprising the following steps:
    providing a driverless transport vehicle according to claim 1,
    providing a semi-trailer to be moved,
    automatically coupling the driverless transport vehicle to a kingpin of a semi-trailer by a coupling device, and
    moving the semi-trailer by starting the driverless transport vehicle.

10. The method according to claim 9, wherein an adapter unit of the coupling device establishes a form-and/or force-fit connection to the kingpin of the semi-trailer in coupling.

11. The method according to claim 9, wherein the semi-trailer is lifted by a device immediately before and/or during and/or immediately after coupling.

12. The method according to claim 11, wherein the device is a hydraulic device.

13. The driverless transport vehicle according to claim 1, wherein the fifth-wheel coupling is configured to be movable relative to a body of the vehicle in a vehicle transverse direction and/or in a vehicle longitudinal direction to align the fifth-wheel coupling to the kingpin.

14. The driverless transport vehicle according to claim 1, further comprising a locking device integrated into the fifth-wheel plate by which the kingpin can be locked to the fifth-wheel plate when the fifth-wheel plate engages the kingpin.

15. The driverless transport vehicle according to claim 1, wherein the at least four sensors comprise at least four laser sensors arranged at four different corners or edges of the substantially cuboid base body.

\* \* \* \* \*